US009529513B2

(12) United States Patent
Balan et al.

(10) Patent No.: US 9,529,513 B2
(45) Date of Patent: Dec. 27, 2016

(54) TWO-HAND INTERACTION WITH NATURAL USER INTERFACE

(71) Applicant: Microsoft Technology Licensing, LLC, Redmond, WA (US)

(72) Inventors: Alexandru Balan, Redmond, WA (US); Mark J. Finocchio, Redmond, WA (US); Kyungsuk David Lee, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 13/959,555

(22) Filed: Aug. 5, 2013

(65) Prior Publication Data

US 2015/0040040 A1 Feb. 5, 2015

(51) Int. Cl.
*G06F 3/0481* (2013.01)
*G06F 3/0484* (2013.01)
(Continued)

(52) U.S. Cl.
CPC ........... *G06F 3/04847* (2013.01); *G06F 3/011* (2013.01); *G06F 3/017* (2013.01); *G06F 3/0304* (2013.01);
(Continued)

(58) Field of Classification Search
CPC ......... G06F 3/017; G06F 3/048; G06F 3/0325
See application file for complete search history.

(56) References Cited

U.S. PATENT DOCUMENTS 7,274,800 B2 9/2007 Nefian et al.
8,176,442 B2 5/2012 Poot
(Continued)

FOREIGN PATENT DOCUMENTS

EP 0679984 A1 11/1995
GB 2494907 A 3/2013
(Continued)

OTHER PUBLICATIONS

Burger, et al., "Two-Handed Gesture Recognition and Fusion with Speech to Command a Robot", Retrieved at <<http://homepages.laas.fr/lerasle/pdf/ar12.pdf>>, In Journal of Autonomous Robots, Dec. 21, 2011, pp. 19.
(Continued)

*Primary Examiner* — Dorothy Harris
(74) *Attorney, Agent, or Firm* — Brianna Hinojosa-Flores; Judy Yee; Micky Minhas

(57) ABSTRACT

Two-handed interactions with a natural user interface are disclosed. For example, one embodiment provides a method comprising detecting via image data received by the computing device a context-setting input performed by a first hand of a user, and sending to a display a user interface positioned based on a virtual interaction coordinate system, the virtual coordinate system being positioned based upon a position of the first hand of the user. The method further includes detecting via image data received by the computing device an action input performed by a second hand of the user, the action input performed while the first hand of the user is performing the context-setting input, and sending to the display a response based on the context-setting input and an interaction between the action input and the virtual interaction coordinate system.

19 Claims, 7 Drawing Sheets

(51) Int. Cl.
G06F 3/0482 (2013.01)
G06T 19/00 (2011.01)
G06F 3/01 (2006.01)
G06F 3/03 (2006.01)

(52) U.S. Cl.
CPC ......... *G06F 3/0482* (2013.01); *G06F 3/04812* (2013.01); *G06F 3/04815* (2013.01); *G06F 3/04842* (2013.01); *G06T 19/006* (2013.01)

(56) References Cited

U.S. PATENT DOCUMENTS

| | | | |
|---|---|---|---|
| 2006/0010400 A1* | 1/2006 | Dehlin | G06F 3/0354 715/856 |
| 2008/0120577 A1* | 5/2008 | Ma et al. | 715/863 |
| 2008/0244468 A1 | 10/2008 | Nishihara et al. | |
| 2009/0073117 A1* | 3/2009 | Tsurumi et al. | 345/158 |
| 2010/0156787 A1* | 6/2010 | Katayama | 345/157 |
| 2010/0199232 A1* | 8/2010 | Mistry et al. | 715/863 |
| 2012/0056989 A1* | 3/2012 | Izumi | H04N 13/0014 348/46 |
| 2012/0163723 A1 | 6/2012 | Balan et al. | |
| 2012/0235904 A1 | 9/2012 | Plagemann et al. | |
| 2013/0016126 A1* | 1/2013 | Wang | G06F 3/041 345/650 |
| 2013/0021491 A1* | 1/2013 | Lee et al. | 348/222.1 |
| 2014/0208275 A1* | 7/2014 | Mongia et al. | 715/863 |

FOREIGN PATENT DOCUMENTS

| | | |
|---|---|---|
| GB | 2495159 A | 4/2013 |
| WO | 2013095679 A1 | 6/2013 |

OTHER PUBLICATIONS

Joslin, et al., "Dynamic Gesture Recognition", Retrieved at <<http://ieeexplore.ieee.org/stamp/stamp.jsp?tp=&arnumber=1604461>>, In Proceedings of the IEEE Instrumentation and Measurement Technology Conference, vol. 3, May 16, 2005, pp. 6.

Xu, et al., "Real-Time Dynamic Gesture Recognition System Based on Depth Perception for Robot Navigation", Retrieved at <<http://ieeexplore.ieee.org/stamp/stamp.jsp?tp=&arnumber=6491047, In IEEE International Conference on Robotics and Biomimetics, Dec. 11, 2012, pp. 6.

"GestPoint Maestro 3D™", Retrieved at <<http://productsummary.gesturetek.com/GestPoint_Maestro3D_Handout.pdf>>, May 5, 2012, p. 1.

ISA European Patent Office, International Search Report and Written Opinion Issued in Application No. PCT/US2014/049322, Nov. 4, 2014, WIPO, 11 Pages.

IPEA European Patent Office, Second Written Opinion issued in Application No. PCT/US2014/049322, Jul. 3, 2015, Germany, 8 Pages.

IPEA European Patent Office, International Preliminary Report on Patentability issued in Application No. PCT/US2014/049322, Oct. 22, 2015, WIPO, 9 pages.

* cited by examiner

TWO-HAND INTERACTION WITH NATURAL USER INTERFACE

BACKGROUND

Natural user interfaces have been developed to provide an intuitive mechanism for a user to control a user interface. Natural user interfaces may utilize one or more sensors to monitor for inputs such as hand/arm gestures and/or voice commands, which are translated into user interface controls.

SUMMARY

Embodiments related to two-handed interactions with a natural user interface are disclosed. For example, one embodiment provides a method comprising detecting via image data received by the computing device a context-setting input performed by a first hand of a user, and sending to a display a user interface positioned based on a virtual interaction coordinate system, the virtual coordinate system being positioned based upon a position of the first hand of the user. The method further comprises detecting via image data received by the computing device an action input performed by a second hand of the user, the action input performed while the first hand of the user is performing the context-setting input, and sending to the display a response based on the context-setting input and an interaction between the action input and the virtual interaction coordinate system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a natural user interface may be utilized by a computing device to receive user inputs. Natural user interfaces may allow users to interact with the computing device via such actions as body gestures/postures and voice commands that are detected via sensors in the use environment. Examples of such sensors include, but are not limited to, image sensors (including depth cameras and two-dimensional image sensors), acoustic sensors, and/or motion sensors. However, determining whether a detected gesture, speech segment, and/or other action performed by a user is intended to control the interface may pose challenges, as actions that correspond to user interface commands also may correspond to actions performed outside of the user interface context.

Further, some types of natural user interfaces may pose additional challenges. For example, a natural user interface for an augmented reality display device, such as a see-through head-mounted display device, may utilize user interface elements displayed as stereoscopic images located in a user's field of view. When the user attempts to interact with such user interface elements, the apparent location of the user interface elements with regard to a user's body may at times be difficult for the user to accurately perceive. This may pose challenges to user interactions with the user interface.

Accordingly, embodiments are disclosed herein that relate to interactions with natural user interfaces that may help to manifest a user intent to interact with a user interface, and that also may facilitate spatial perception of user gestures relative to user interface elements. Briefly, the disclosed embodiments utilize two-handed interactions in which one hand performs a context-setting gesture that defines a context for a dynamic action gesture performed by the other hand. The context-setting gesture may signal the user's intent to perform a user interface interaction and potentially a specific context for the interaction, and also may provide a reference location used to position a coordinate system for displaying a user interface and making dynamic action gestures.

Figure 1:
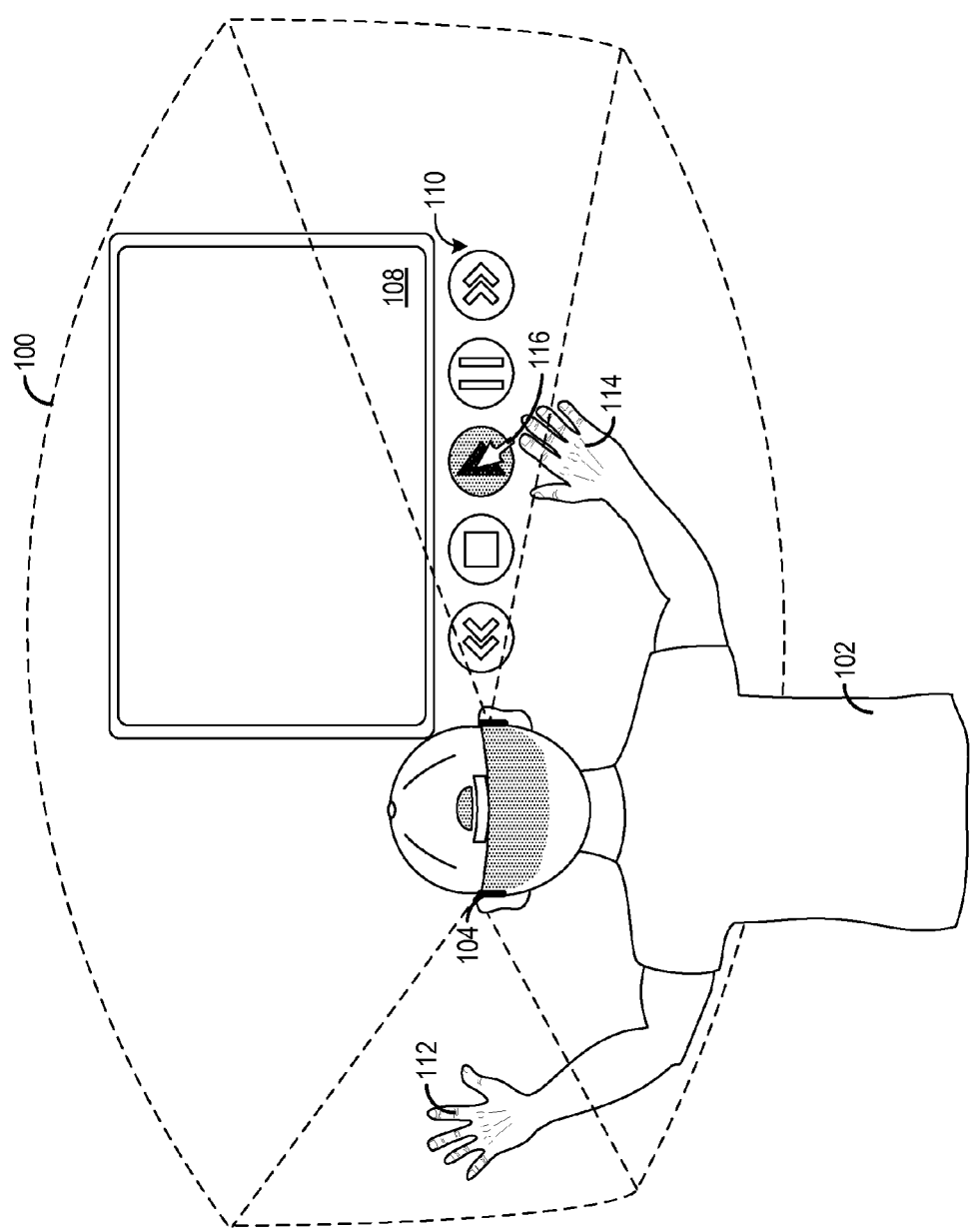
FIG. 1 schematically shows a user viewing an augmented reality user interface according to an embodiment of the present disclosure.

FIG. 1 shows a first-person perspective of a user 102 viewing an augmented reality user interface 100 displayed on a near-eye display device 104 according to an embodiment of the disclosure. The augmented reality user interface 100 of FIG. 1 comprises a holographic television 108 and a plurality of control elements 110 each configured to control one or more aspects of the playback of media on holographic television 108. The depicted control elements 110 include a play button, stop button, pause button, fast forward button, and reverse button, but it will be understood that such a user interface may include any suitable controls. Further, while FIG. 1 illustrates virtual objects, in some embodiments user 102 may also view real world objects along with the virtual objects via a see-through near-eye display device. It will be understood that the depicted holographic television 108 is provided as an example of an augmented reality user interface 100 displayed to user 102, and that any other suitable user interface may be displayed. Examples include, but are not limited to, other entertainment-related user interfaces (e.g. gaming interfaces and audio players), browsers (web, file, etc.), productivity software-related interfaces, communication interfaces, operating system/firmware/hardware control interfaces, etc.

Gesture input from user 102 may be used to control one or more aspects of near-eye display device 104. For example, near-eye display device 104 may receive image information from one or more sensors (described below) and identify in such image and/or audio information body gestures (including postures) used to control near-eye display device 104. While described in the context of a near-eye display device, it will be understood that the user interface interactions described herein may be used with any other computing system configured to receive input via image sensors. Examples include, but are not limited to, desktop computers, laptop computers, tablet computers, smart phones, and other wearable computing systems.

Gestures performed by user 102 may be detected via image information received from one or more image sensors, such as depth cameras located on the near-eye display device 104. Such gestures may be used to control one or more computer programs. To indicate a functionality (program, program context, etc.) that user 102 is intending to control, user 102 may perform a context-setting gesture with a first hand. As one example, in FIG. 1 user 102 is holding up a left hand 112 in an extended open-palm configuration with the palm of the user facing away from the user and the fingers and thumb held apart. This context-setting gesture may trigger, for example, a cursor control mode in which user 102 controls one or more aspects of the user interface with a displayed cursor 116. The user's other hand then may be used to control the cursor, as described in more detail below.

Upon detection of a context-setting input, near-eye display device 104 may locate a virtual interaction coordinate system based on a position of the context-setting input hand (e.g., a first hand) of the user. The virtual interaction coordinate system may comprise a spatial region in which a second hand of the user may perform dynamic action gestures to control one or more aspects of the user interface displayed to the user. User interface elements also may be displayed based upon the virtual interaction coordinate system, and thus may be positioned based upon the location of the context-setting input hand. In this manner, the context-setting input hand may provide a real-world reference location to assist the user in making dynamic action gestures with the other hand.

It will be understood that other sensors also may be used with near-eye display device 104. For example, near-eye display device 104 may include one or more motion sensors to detect movements of a user's head when the user is wearing the display system. Motion data may be used, potentially along with eye-tracking data and outward-facing image data, for gaze tracking, as well as for image stabilization to help correct for blur in images from the outward-facing image sensor(s). Near-eye display device 104 also may include acoustic sensors, such as microphones. It will be understood that sensors are described for the purpose of example and are not intended to be limiting in any manner, as any other suitable sensors and/or combination of sensors may be utilized.

Near-eye display device 104 further comprises a computing device having a logic machine and a data holding machine in communication with the sensors and display subsystem. The data holding machine comprises instructions stored thereon that are executable by logic machine, for example, to receive and interpret inputs from the sensors, to determine an gestures performed by the user, and to send a response to the detected gesture(s) to the see-through near-eye display subsystem. Example hardware configurations are described in more detail below.

Figure 2:
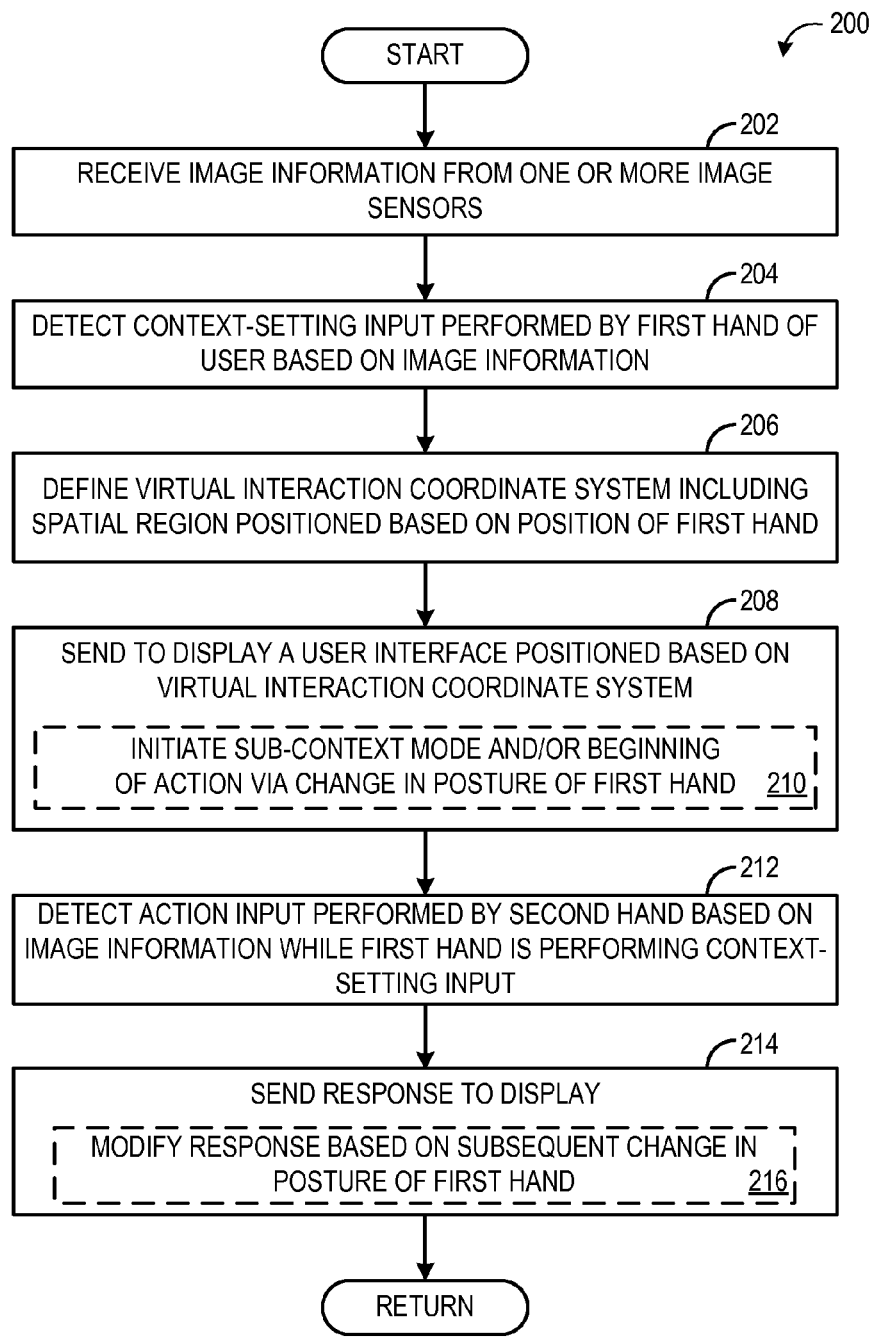
FIG. 2 is a flow diagram illustrating a method for controlling a user interface according to an embodiment of the present disclosure.

FIG. 2 illustrates a method 200 of controlling a user interface via two-handed interactions. Method 200 may be performed by any suitable computing system, including but not limited to near-eye display device 104. At 202, method 200 includes receiving image information from one or more image sensors. The image sensors may include one or more depth cameras and/or one or more two-dimensional cameras.

Method 200 further comprises, at 204, detecting a context-setting input performed by a first hand of a user based on the received image information. The context-setting input may comprise any suitable hand gesture or posture. As one example, a user may place the context-setting input hand in a first position in front of his body. In other examples, the user may place the context-setting input hand into a "C" shape, or the user may hold up the hand in an open, extended position with the fingers held close together or separated. It will be understood that any suitable hand gesture (including hand postures) is within the scope of this application.

At 206, method 200 includes defining a virtual interaction coordinate system comprising a spatial region positioned based on the position of the first hand. For example, the virtual interaction coordinate system may be centered over the first hand of the user, may start from and extend out from the first hand of the user, or may have any other suitable position relative to the first hand of the user. The virtual interaction coordinate system may have any suitable number of dimensions.

The virtual interaction coordinate system may have any suitable size. In one example, the virtual interaction coordinate system may be a fixed size regardless of the size of the user's hand or other variables. In other examples, the virtual interaction coordinate system may have a size that varies based on one or more parameters of the user, environment, and/or user interface. For example, the coordinate system may be sized based on a size of the user's first hand, based on a distance from the user's first hand to a sensor observing the user, based on the size and/or nature of the user interface elements being controlled by the user, or sized based upon other suitable parameters.

In some embodiments, the virtual interaction coordinate system, or portions thereof, may be displayed to the user. As one example, the virtual interaction coordinate system may be displayed on a see-through near-eye display device as a grid located based upon the first hand of the user. As another example, a plane extending from the user's first hand within the coordinate system may be displayed as a reference plane. In other embodiments, the virtual interaction coordinate system may not be displayed to the user.

Method 200 further comprises, at 208, sending a user interface to a display (i.e. sending data representing the user interface). In some examples, the displayed user interface may be specific to the context defined by the context-setting input and sent in response to the context-setting input. In other examples, the user interface may be sent prior to the user performing the context-setting input. For example, the user interface may be sent in response to a previous context-setting input, in response to a speech input or other type of input, etc. In examples where the user interface is sent to the display prior to the user performing the context-setting input, the performed context-setting input may define a sub-context of the user interface, such as a particular control mode.

Sending the user interface to the display may include initiating a sub-context and/or triggering the beginning of an action via a change in posture of the user's first hand, as indicated at 210. As one example of setting a sub-context, a first context-setting input may trigger display of a user interface of a drawing program, where hand gestures performed by the second hand of the user may be translated into a drawing. Prior to the user moving his second hand to create a drawing, and after display of the drawing interface, the user may change the posture of the initial context-setting input (e.g. from an extended hand with the fingers and thumb close together to an adjusted position with the thumb extended away from the hand, or other suitable gesture) to initiate a sub-context mode of the drawing program. Responsive to this change, an image of a drawing tool may be sent to the display and positioned at the finger of the second hand of the user. This change in posture of the context-setting input may then signal the beginning of an action input performed by the second hand of the user. Subsequent movement of the second hand may then result in the display of a corresponding drawing element in the drawing user interface. In this manner, the user may define the beginning and end of line segments by changing the posture of the first hand.

In some embodiments, the change in posture of the context-setting input may initiate markup of the user interface. As described above, the markup to the user interface may comprise a drawing on the user interface, defined by movement of the second hand. However, other markups to the user interface are possible. For example, the markup may include highlighting of text, entry of freeform text, or other such interactions that are performed in a freeform manner.

At 212, method 200 includes detecting an action input performed by the second hand of the user based on received image information. The action input may be performed by the second hand while the first hand is performing the context-setting gesture. The action input may comprise any suitable gesture, posture, and/or movement of the second hand of the user. In some embodiments, the gestures and/or postures performed by the second hand may be performed within the virtual interaction coordinate system, and movement of the second hand may be tracked based upon the virtual interaction coordinate system.

At 214, method 200 comprises sending a response to the action input to the display. As mentioned above, the response sent is based upon the combination of the context-setting input and dynamic action input. Examples of inputs and responses are described in more detail below.

Method 200 may further include modifying a displayed response based on a subsequent movement of the first hand, as indicated at 216. For example, after sending the captured image to the display, if the user rotates his or her first hand (e.g., the context-setting input hand) in a clockwise direction, an image displayed in response to the action input (e.g. a captured photograph, a drawing made in a drawing program, etc.) may also be rotated in a clockwise direction. Further, modifying the displayed response may include signaling an end of the action input and/or an end of the markup being made to and displayed on the user interface. In the example of the drawing program described above, after an action input is performed, if a change in posture of the first hand is detected, the drawing of a line segment on the user interface in response to motions of the user's second hand may end.

Figure 3:
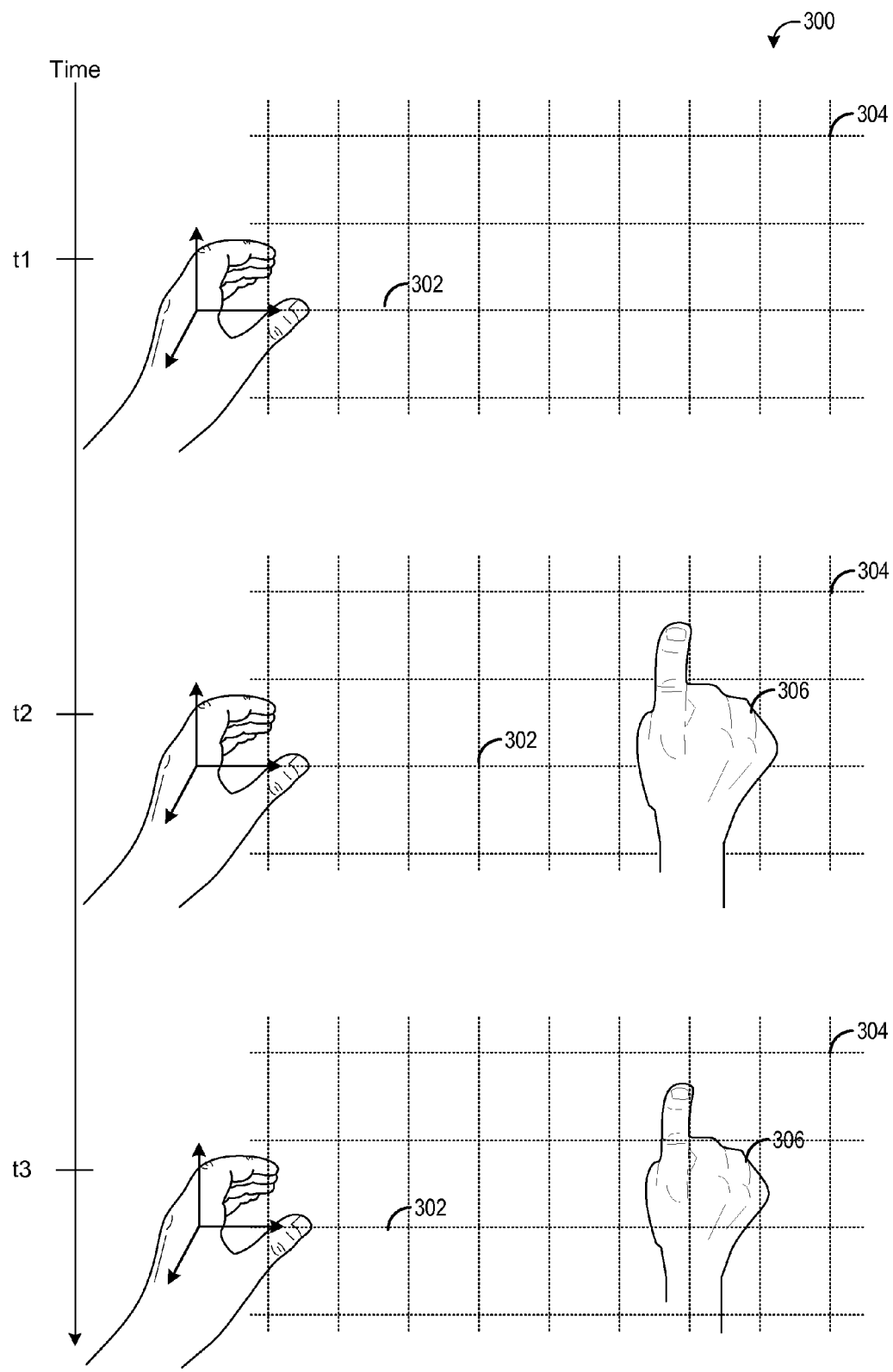
FIG. 3 illustrates a sequence of example hand gestures performed while interacting with a user interface according to an embodiment of the present disclosure.

FIG. 3 shows an example of a sequence of hand movements 300 performed by a user in order to control a user interface via two hand interaction with the user interface according to an embodiment of the disclosure. The depicted series of interactions may be used to control any suitable computing device action. As one non-limiting example, the depicted sequence of hand movements may be used to control an image capture device incorporated into near-eye display device 104.

At time t1, the user holds up a first hand 302 in a context-setting input comprising a "c"-shaped posture. In response, a virtual interaction coordinate system is defined based on the context-setting input. The virtual interaction coordinate system may extend out from first hand 302 toward a region in which the second hand may naturally interact. The virtual interaction coordinate system may have any suitable number of dimensions, and is illustrated as including a plane 304 aligned with first hand 302. Plane 304 may or may not be displayed in various embodiments.

At time t2, the user holds up a second hand 306 in the virtual interaction coordinate system in front of plane 304. As shown, an index finger of the second hand is extended. At time t3, the user moves his or her second hand 306 from in front of plane 304 to behind plane 304. Motion of the second hand from one side of plane 304 to another side of plane 304, such from in front of plane 304 to behind plane 304 from a viewpoint of the user and/or near-eye display device, for example, may trigger capture of an image via an on-board camera of the near-eye display device followed by the display of the captured image via the near-eye display device.

Figure 4:
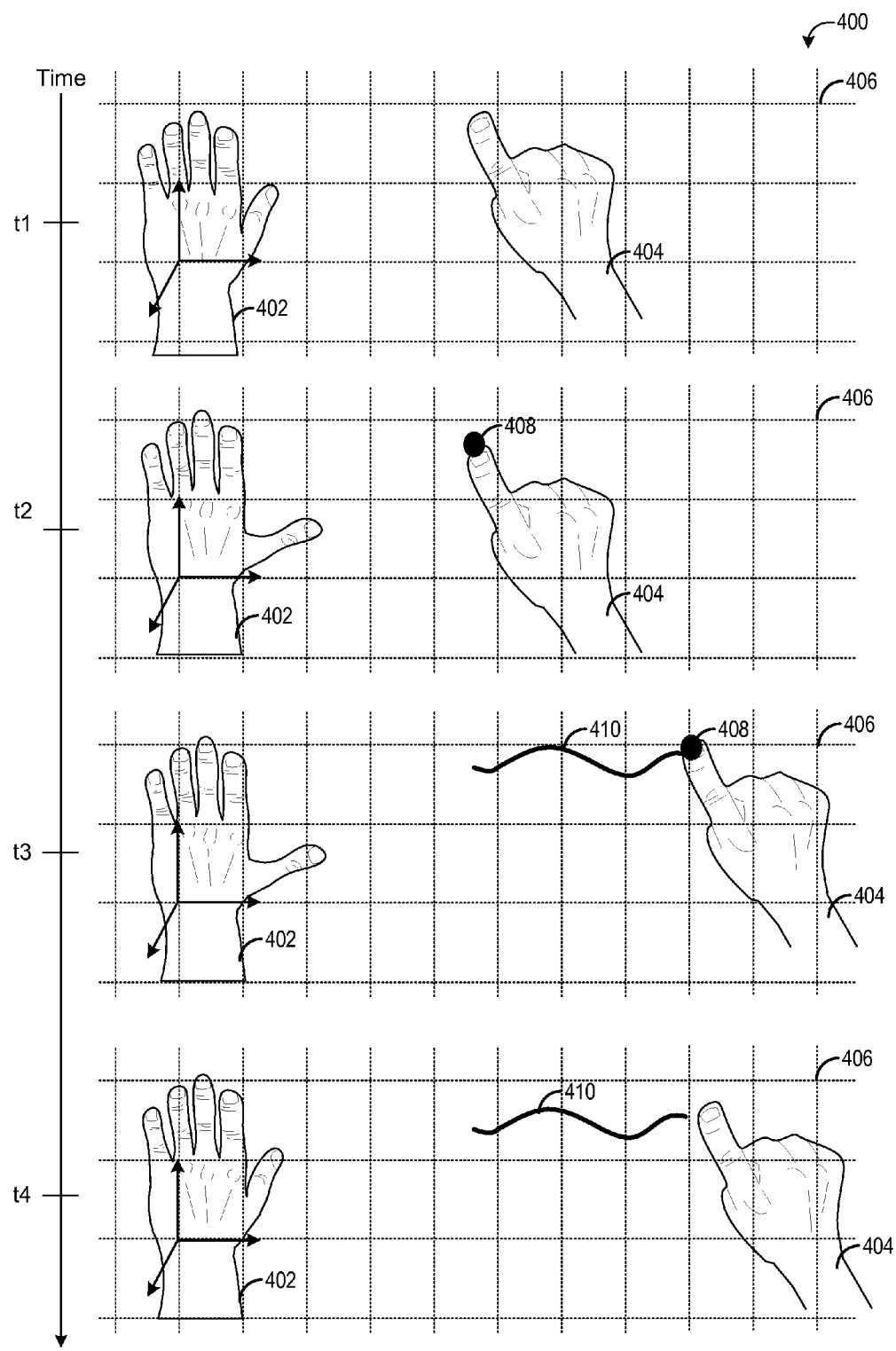
FIG. 4 illustrates another sequence of example hand gestures performed while interacting with a user interface according to an embodiment of the present disclosure.

FIG. 4 shows another example sequence of hand movements 400 useable to interact with a natural user interface via two-hand interactions according to an embodiment of the disclosure. The illustrated sequence of hand movements 400 may be used, for example, to control a user interface for a drawing program executed on a near-eye display device.

At time t1, the user is holding up a first hand 402 and a second hand 404. First hand 402 is performing a context-setting input comprising an open-palm posture with fingers extended and held close together, and second hand 404 is in a fist posture with an index finger extended. The context-setting input of first hand 402 triggers execution of a drawing program on the near-eye display device. As such, a user interface specific to the drawing program may be displayed on the display of the near-eye display device. While depicted behind plane 406, the second hand also may be positioned in front of the plane 406.

At time t2, the posture of the context-setting input is changed, signaling a change to a sub-context in which drawing may be performed. As shown in FIG. 4, the thumb of first hand 402 is moved away from the palm. In response, a drawing tool 408 is displayed over the finger of the second hand 404, and any subsequent movement of the finger of the second hand 404 is translated into a drawing. As shown at time t3, movement of the finger of second hand 404 is translated into a drawing 410.

At time t4, the thumb of first hand 402 is moved back from the extended position to a position closer to the other fingers of first hand 402. This movement signals the end of the drawing input. As such, drawing tool 408 is removed, and the drawing 410 is complete. Thus, by selectively changing the posture of the first hand, the user may clearly express an intent to start and end the drawing of individual line segments.

Figure 5:
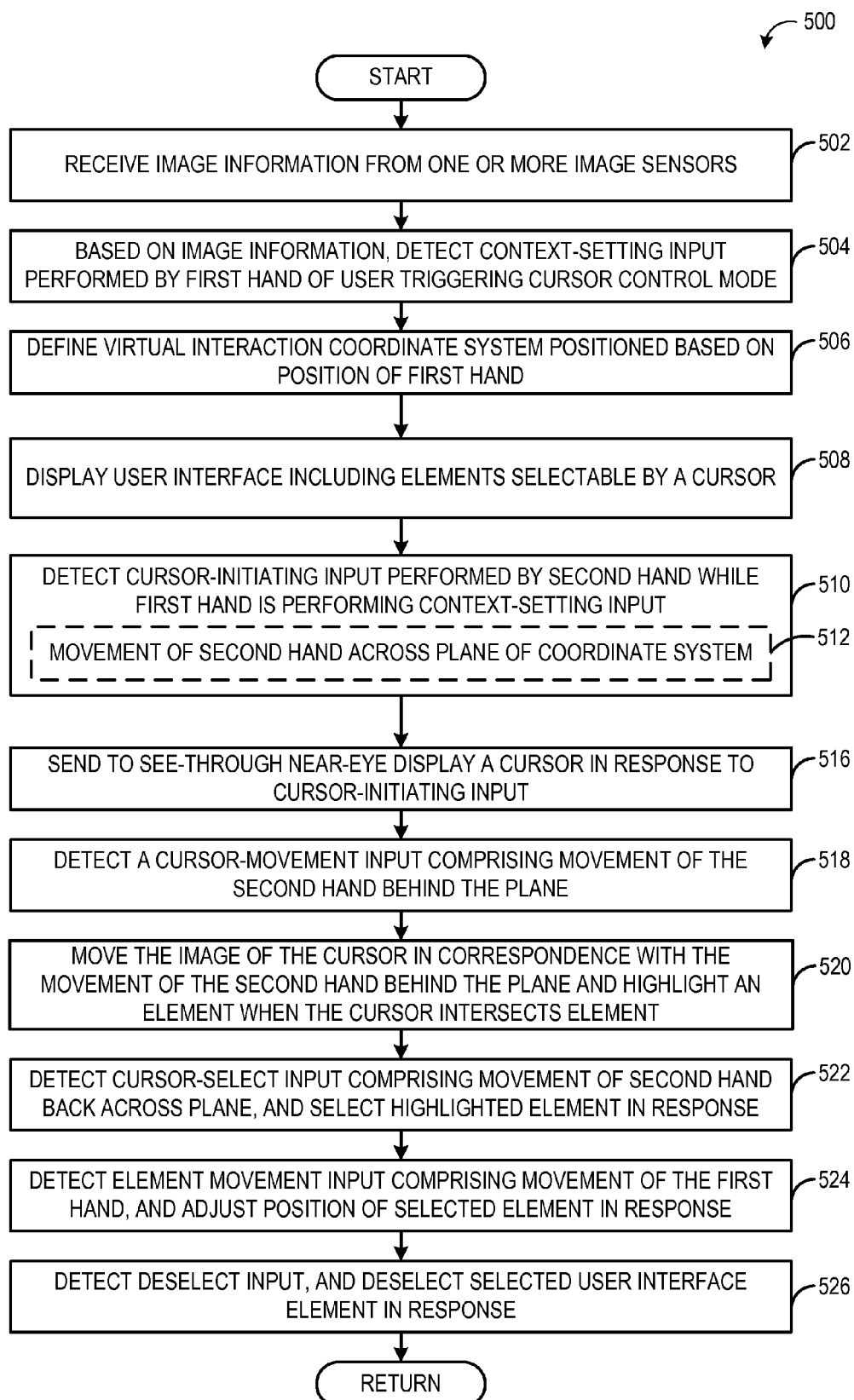
FIG. 5 is a flow diagram illustrating a method for controlling a user interface according to another embodiment of the present disclosure.

FIG. 5 shows a flow diagram depicting a method 500 for interacting with a user interface according to another embodiment of the present disclosure. Method 500 may be carried out by any suitable computing device, including but not limited to near-eye display device 104, in order to interact with interface elements via a cursor.

Method 500 includes, at 502, receiving image information from one or more image sensors, and at 504, detecting a context-setting input triggering a cursor control mode performed by a first hand of a user via the received image information. As a non-limiting example, the context-setting input may comprise the first hand of the user being moved into an open-palm position. At 506, in response to detecting the context-setting input, a virtual interaction coordinate system is defined, wherein the virtual interaction coordinate system comprises a spatial region positioned based on a position of the first hand.

Method 500 further comprises, at 508, sending an augmented reality user interface comprising one or more elements selectable by a cursor to a display, such as a see-through near-eye display, wherein the augmented reality user interface is positioned based on the position of the first hand. Continuing, method 500 further comprises, at 510, detecting a cursor-initiating input. As indicated at 512, the cursor-initiating input may comprise a movement of a second hand of the user crossing a plane extending from the first hand from a position in front of the plane to a position behind the plane from a viewpoint of the near-eye display device. The user interface may be displayed such that the second hand of the user passes from an apparent location in front of the user interface to an apparent location behind the user interface.

In response to detecting the cursor-initiating input, method 500 comprises, at 516, displaying a cursor at a position associated with a position of the second hand. Method 500 further comprises, at 518, detecting a cursor movement input comprising lateral movement of the second hand behind the plane. In response to detecting the lateral input, at 520, the cursor is moved in correspondence with the movement of the second hand behind the plane. Further, an element of the augmented reality user interface may be highlighted when the cursor intersects the element.

At 522, method 500 includes detecting a cursor select input, and in response to detecting the cursor select input, selecting the highlighted element of the augmented reality user interface. The cursor select input may comprise, for example, movement of the second hand from behind the plane to in front of the plane. This also may exit the cursor movement control mode in which cursor movement follows lateral movement of the second hand of the user.

Once the user interface element has been selected, other interactions may be performed. For example, an application associated with the user interface element may be executed via an additional input (gesture, voice, etc.), in the case of a user interface element that represents an executable program. As another example, the user interface element may be moved. As such, method 500 comprises, at 524, detecting an element manipulation input, and in response, moving a displayed position of the selected highlighted element. The element manipulation input may be detected subsequent to selecting the highlighted element and may comprise movement of the first hand while holding the context-setting posture.

As another example of an interaction performed after selection of a user interface element, method 500 includes, at 526, deselecting the selected element in response to a deselect input. The deselect input may comprise movement of the second hand from in front of the plane to behind the plane, ending of the context-setting posture of the first hand, and/or any other suitable action.

Figure 6:
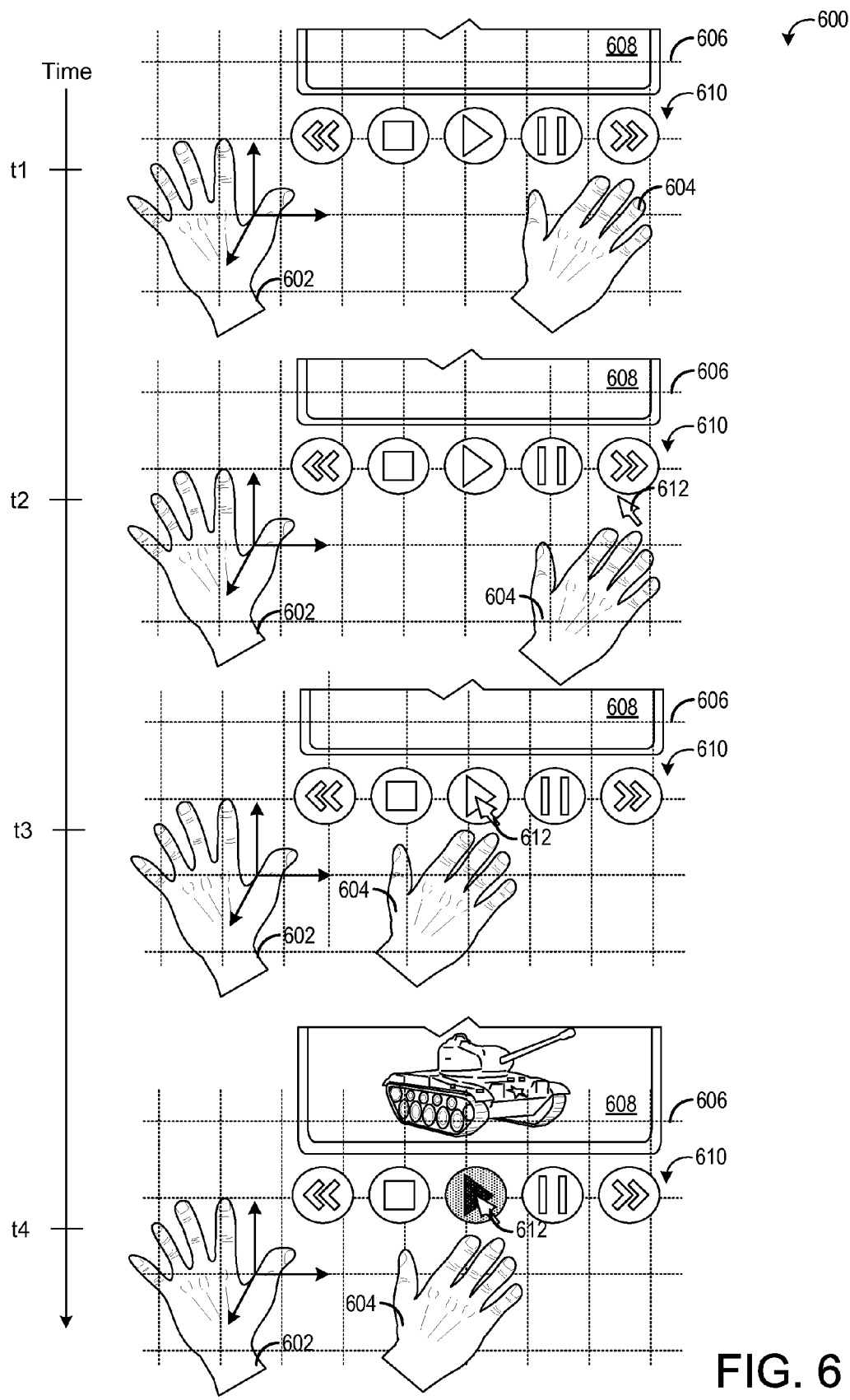
FIG. 6 illustrates another sequence of example hand gestures performed to control a user interface according to an embodiment of the present disclosure.

FIG. 6 shows another example embodiment of hand movements 600 useable to interact with a natural user interface via two hand interactions. In the depicted embodiment, the sequence of hand movements 600 is described in the context of controlling an augmented reality user interface for a holographic television in an augmented reality environment, but the sequence may be used in any other suitable setting.

At time t1, the user is holding up a first hand 602 and a second hand 604. The first hand 602 is performing a context-setting input comprising an open-palm posture with fingers extended and spread apart. Second hand 404 is in front of plane 606 of a virtual interaction coordinate system. The plane 606 may or may not be displayed. In one embodiment, the plane 606 may be displayed upon detecting the context-setting input.

A holographic television 608 and plurality of control elements 610 are displayed on the see-through near-eye display. The holographic television 608 and/or plurality of control elements 610 may be positioned based on the position of one or more of the first hand 602 and second hand 604 such that at least second hand 604 is able to perform movements that interact with the plurality of control elements 610.

At time t2, the user performs a cursor-initiating input comprising movement of the second hand 604 from in front of the plane 606 to behind the plane 606 from a viewpoint of the near-eye display device. As a result, cursor 612 is displayed on the see-through near-eye display.

At time t3, the user performs a cursor-movement input comprising lateral movement of the second hand 604 behind the plane 606. Cursor 612 moves in correspondence with the cursor-movement input and intersects one of the plurality of control elements 610, which in the illustrated example is a play button. When cursor 612 intersects a selectable element of the augmented reality user interface, in some embodiments the element may become highlighted or otherwise visualized.

At time t4, the user performs a cursor-select input comprising movement of second hand 604 from behind plane 606 to in front of plane 606. As a result of the movement, any elements highlighted by the cursor will be selected. In the illustrated example, the play button is selected and as a result, a video on holographic television 608 is displayed.

Thus, the embodiments disclosed herein may facilitate the expression of a user's intent to interact with a natural user interface, as well as a context in which to interact. Further, the disclosed embodiments also may help to provide a user with a positional reference, in that motions of the second hand when making dynamic actions inputs may be positionally referenced to the first context-setting hand.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
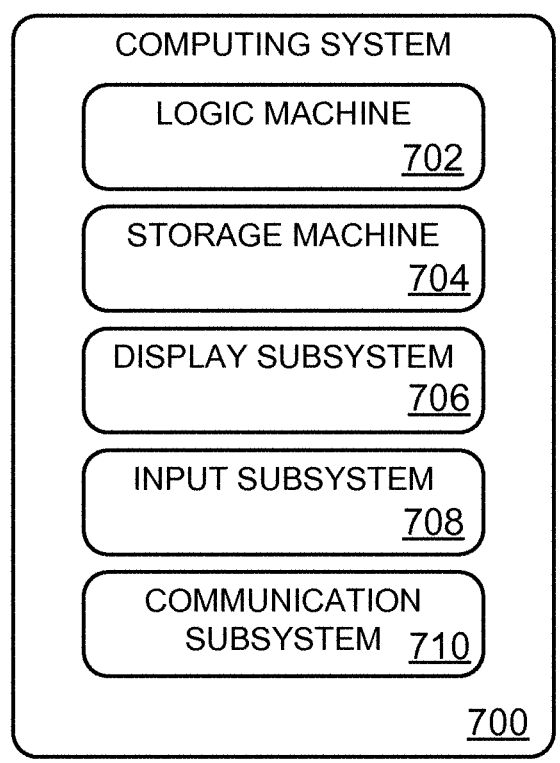
FIG. 7 schematically shows an example embodiment of a computing system.

FIG. 7 schematically shows a non-limiting embodiment of a computing system 700 that can enact one or more of the methods and processes described above. Near-eye display device 104 may be one non-limiting example of computing system 700. In another example, computing system 700 may take the form of an entertainment system configured to receive video and/or gaming content from one or more sources and display the video and/or gaming content on a connected display device.

Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), wearable computing devices (e.g. head-mounted displays) and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program or may be instantiated via logic machine 702 executing instructions held by storage machine 704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method comprising:
   detecting via image data received by the computing device a first posture of a context-setting input performed by a first hand of a user to trigger execution of a drawing program;
   in response to detecting the first posture of the context-setting input, sending to a display a holographic stereoscopic user interface for the drawing program positioned based on a virtual interaction coordinate system, the virtual interaction coordinate system comprising a reference plane positioned based upon a position of the first hand of the user;
   detecting via image data received by the computing device a change in the first posture to a second posture of the context-setting input performed by the first hand, and in response, triggering a sub-context for the drawing program to detect drawing input;
   detecting via image data received by the computing device a drawing input performed by a second hand of the user relative to the holographic stereoscopic user interface and relative to the reference plane within the virtual reference coordinate system, the drawing input performed while the first hand of the user is performing the second posture of the context-setting input; and
   displaying a drawing in the holographic stereoscopic user interface based on the drawing input relative to the reference plane within the virtual interaction coordinate system.

2. The method of claim 1, wherein detecting the drawing input further comprises detecting a movement of the second hand through the reference plane of the virtual interaction coordinate system from a position on one side of the reference plane to a position on another side of the reference plane from a viewpoint of the user, the reference plane located at a same apparent depth at which the user interface is displayed.

3. The method of claim 2, wherein detecting the second hand crossing through the reference plane triggers an image capture process via a camera.

4. The method of claim 1, further comprising, detecting a change in posture of the first hand from the second posture, and in response, triggering an end of the drawing input.

5. The method of claim 4, wherein the change in posture of the first hand triggers an end of a marking up of the user interface by the second hand.

6. The method of claim 1, further comprising sending to the display a user interface including one or more elements selectable by a cursor, detecting another context-setting input triggering a cursor control mode, detecting a movement of the second hand of the user across the reference plane within the virtual interaction coordinate system from a position in front of the reference plane to a position behind the reference plane from a viewpoint of the computing device, and sending the cursor to the display.

7. The method of claim 6, further comprising:
   detecting a cursor-movement input comprising lateral movement of the second hand behind the reference plane;
   in response to detecting the cursor-movement input, move the cursor in correspondence with the movement of the second hand behind the reference plane.

8. The method of claim 7, further comprising:
   highlighting an element of the user interface when movement of the cursor intersects the element; and
   selecting the element highlighted in response to detecting a cursor-select input comprising movement of the second hand from behind the reference plane to in front of the reference plane while the element is highlighted.

9. A near-eye display system, comprising:
   a see-through near-eye display;
   one or more image sensors;
   a logic machine; and
   a storage machine including instructions executable by the logic machine to:
   receive image information from the one or more image sensors;
   detect a first posture of a context-setting input performed by a first hand of a user based on the image information received to trigger execution of a drawing program;
   in response to detecting the first posture of the context-setting input, define a virtual interaction coordinate system comprising a spatial region including a reference plane positioned based on a position of the first hand;
   send to the see-through near-eye display an augmented reality user interface comprising one or more user interface elements positioned based upon the position of the first hand;
   detect a second posture of the context-setting input performed by the first hand based on the image information received, and in response, trigger a sub-context for the drawing program to detect drawing input;
   detect a drawing input performed by a second hand of the user based on the image information received, the drawing input performed at a location relative to the reference plane within the virtual interaction coordinate system and defined by a location of the first hand and while the first hand of the user is performing the second posture of the context-setting input; and
   display via the see-through near-eye display a drawing based on the drawing input relative to the reference plane within the virtual interaction coordinate system.

10. The near-eye display system of claim 9, wherein the drawing input further comprises a movement of the second hand across the reference plane of the virtual interaction coordinate system from a position on one side of the reference plane to a position on another side of the reference plane from a viewpoint of the see-through near-eye display.

11. The near-eye display system of claim 10, wherein the instructions are executable to trigger an image capture process via a camera in response to the second hand crossing the reference plane.

12. The near-eye display system of claim 9, wherein the instructions are executable to detect a change in posture of the first hand from the second posture, and in response, trigger an end of the drawing input by the second hand.

13. The near-eye display system of claim 9, wherein the augmented user interface includes one or more elements selectable by a cursor, further comprising instructions executable to detect another context-setting input triggering a cursor control mode, detect an action input comprising a movement of the second hand of the user across the reference plane within the virtual interaction coordinate system, and sending the cursor to the see-through near-eye display.

14. A near-eye display system, comprising:
   a see-through near-eye display;
   one or more image sensors;
   a logic machine; and a storage machine including instructions executable by the logic machine to:
  detect a first posture of a context-setting input triggering a drawing program, the first posture of the context-setting input performed by a first hand of a user;
  in response to detecting the first posture of the context-setting input, define a virtual interaction coordinate system comprising a spatial region including a reference plane positioned based on a position of the first hand;
  send to the see-through near-eye display a holographic stereoscopic augmented reality user interface positioned based on the position of the first hand;
  detect a second posture of the context-setting input performed by the first hand, and in response, trigger a sub-context for the drawing program to detect drawing input;
  detect a drawing input comprising a movement of a second hand of the user relative to the reference plane within the virtual interaction coordinate system while the first hand is performing the second posture of the context-setting input;
  in response to detecting the drawing input, display via the see-through near-eye display a drawing based on movement of the second hand; and
  detect a change in the second posture to the first posture of the context-setting input performed by the first hand, and in response, trigger an end of the drawing input by the second hand.

15. The near-eye display system of claim 14, wherein the instructions are further executable to display a drawing cursor based on a position of the second hand.

16. The near-eye display system of claim 15, wherein the instructions are further executable to display the drawing cursor at a position of a finger of the second hand.

17. The near-eye display system of claim 16, wherein the instructions are further executable to highlight an element of the augmented reality user interface when movement of the drawing cursor intersects the element.

18. The near-eye display system of claim 17, wherein the instructions are further executable to:
  subsequent to selecting the highlighted element, detect an element manipulation input comprising movement of the first hand; and
  in response to detecting the element manipulation input, adjusting a position of the selected highlighted element of the augmented reality user interface.

19. The near-eye display system of claim 18, wherein the instructions are further executable to deselect the selected element of the augmented reality user interface in response to a deselect input.

* * * * *